March 9, 1943.  S. WEISS  2,313,377
SPRINGLESS GREASE FITTING
Filed April 27, 1942
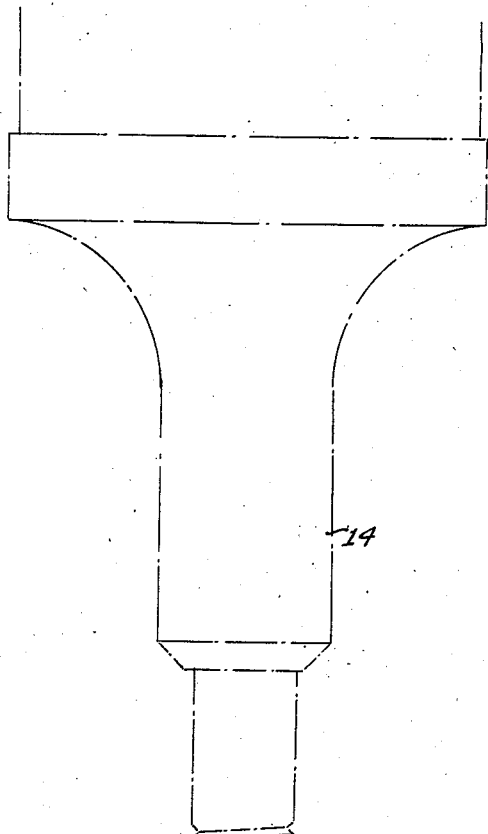
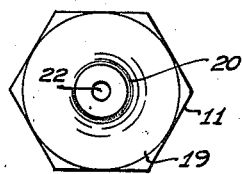
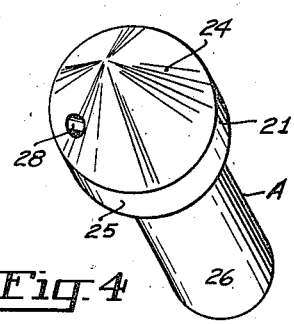
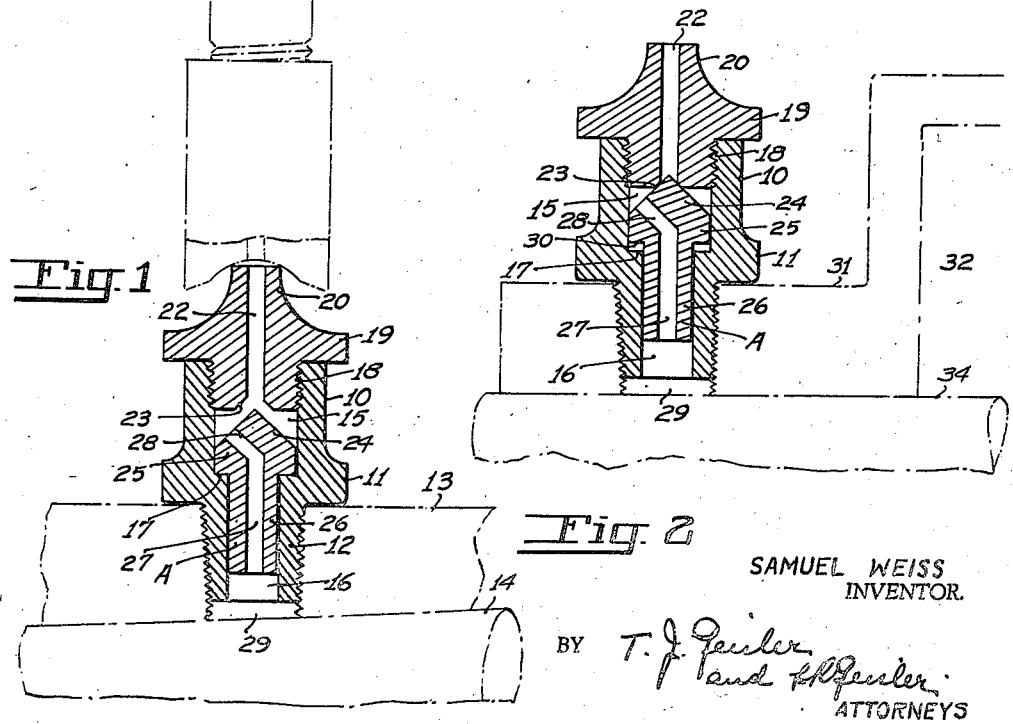
SAMUEL WEISS
INVENTOR.
BY
ATTORNEYS Patented Mar. 9, 1943

2,313,377

UNITED STATES PATENT OFFICE 2,313,377

SPRINGLESS GREASE FITTING

Samuel Weiss, Portland, Oreg.

Application April 27, 1942, Serial No. 440,593

6 Claims. (Cl. 184—105)

This invention relates to grease fittings, or similar devices, used in connection with bearing lubricators in which the grease or lubricant is supplied under pressure.

More specifically, this invention relates to grease seals or fittings adapted to permit the grease or lubricant to be injected from an ordinary grease gun through a suitable opening or channel into a bearing, which is subjected to gas or liquid under pressure, in order to provide proper lubrication for such bearing, and adapted to cause such opening or channel immediately to become sealed, as soon as the grease gun is withdrawn, in order to hold the grease or lubricant in the bearing.

A number of different types of grease fittings, or automatic grease sealing means, are in common use, all of which either have spring-controlled valves, or are spring-operated, or in some way require a spring as an essential element. While such grease fittings are more or less suitable for ordinary purposes, a problem is presented when they are used where they are subjected to the action of acids—as, for example, in paper mills—for while it is possible to make the body and other parts of the fitting of acid-resisting, stainless steel, it is not feasible to make the springs of such material.

The main object of this invention is to provide a grease fitting for use upon bearings or other surfaces which must be lubricated, but which are subjected to corrosive gases or liquids under pressure.

Another object of this invention is to provide a grease fitting in which the employment of a metal spring is entirely eliminated and in which all parts consequently can be made entirely of acid-resisting steel or metal.

A further object of this invention is to provide a springless grease fitting which will be simple, practical, and comparatively inexpensive, and which will be suitable for use in all places where bearings are subjected to gas or liquid pressure.

These and other objects I attain by making my fitting in the form of a housing having a cap with a central bore and a valve slidably mounted inside the housing and movable therein under pressure from within or without, such valve operating to prevent escaping of grease outwardly while permitting passage of grease inwardly; and by otherwise making the fitting in the manner indicated by the accompanying drawing, which illustrates a preferred form of my invention.

In the drawing:

Fig. 1 is a sectional elevation of the assembled grease-fitting shown in place on a plug cock valve, illustrating the operation when grease is being supplied to the fitting and valve from an ordinary grease gun, the adjacent portions of the valve and grease gun being indicated in broken line;

Fig. 2 is a sectional elevation of the grease fitting in place in a hub which is associated with a container showing the position of the valve when the grease gun has been removed, and illustrating the manner in which the fitting is automatically sealed as a result of the pressure within the container to which the bearing is subjected;

Fig. 3 is a top plan view of the grease fitting of Figs. 1 and 2; and

Fig. 4 is a view, in perspective and drawn to a larger scale, of the slidable valve member located within the fitting.

The fitting comprises a main housing portion 10, preferably shaped as shown in Figs. 1 and 2, having a threaded stem or neck 12, adapted to be screwed into place in a valve casing such as that indicated by the broken lines 13 in Fig. 1.

The valve-casing 13 of this figure is assumed to surround a tapered plug 14, as found in the usual plug cock type of valve, and the tapered adjacent surfaces of the plug and casing must be kept lubricated to permit turning of the plug when desired and prevent "freezing."

In Fig. 2 the same grease fitting is shown in place on the hub 31 of a container 32 which has a shaft 34 extending therethrough, the bearing of the shaft 34 thus being subjected to pressure from the liquid within the container 32.

The housing 10 of the fitting preferably has an enlarged wrench-engageable section 11, the outer perimeter of which is hexagonal, to facilitate engagement of the fitting by a wrench when the fitting is to be screwed into place in the valve casing; or the entire outer wall of the housing 10 above the threaded stem or neck 12 could be hexagonal in contour if desired, or made in any other convenient wrench-engageable shape.

The interior of the housing 10 has a shouldered or stepped cylindrical bore, the main portion 15 of which is of larger diameter than the remaining portion 16. Thus a shoulder 17 is provided at the junction of the larger and smaller diameter portions of the stepped bore. The smaller diameter portion 16 extends through the stem or neck 12, while the larger diameter portion 15 extends through the outer end of the housing 10 and is internally threaded at 18 to receive the cap 19.

The cap 19 has an axial bore or channel 22, the inner terminus of which is preferably beveled or counter-sunk as indicated at 23 (Fig. 1). The exterior of the cap 19 may be formed with a curved taper as shown at 20, or shaped in any other manner suitable for fitting into the tip of a grease gun.

The valve member A is placed within the housing 10 as shown. This valve member has a cylindrical stem 26, the diameter of which is approximately the same as the diameter of the bore 16 in the neck or stem 12 of the housing, so as to cause the valve stem 26 to fit within the bore 16 but to be longitudinally slidable therein. The length of the stem 26 of the valve member A is less than the length of the bore 16 of the housing.

The valve member A is formed with an enlarged portion 25 which has a cylindrical wall 21, the diameter of which is of proper size to permit a sliding fit within the interior 15 of the housing 10, and this enlarged portion 25 terminates in a conically-shaped head 24. The degree of slope of the conical surface of the head 24 is preferably the same as that of the bevel or countersink 23 of the inner end of the cap bore or channel 22 so as to form a better seal for the channel 22 when the conical head 24 is pressed against the cap 19.

At the junction between the stem 26 and the larger cylindrical portion 25 of the valve member A, a shoulder 30 is formed, which, when the valve is in the position shown in Figure 1, rests against the shoulder 17 of the housing 10. The axial length of the valve head and enlarged portion above the shoulder 30 is limited sufficiently to enable the valve to be slidable within the housing 10 when the cap 19 is screwed in place in the housing.

A channel extends through the valve member A to permit passage of grease therethrough. This channel comprises two connecting sections 27 and 28, the first of which constitutes an axial bore through the stem 26 of the valve and the second of which extends through the valve head at an angle to the axis. Preferably the section 28 of the valve passageway extends perpendicular to the slope line of the conical surface of the head 24 at the intersection of the passageway with the conical surface.

The operation of my grease fitting will now be apparent from Figures 1 and 2. When grease is being forced into the fitting from a grease gun (such as that indicated at 14 in Figure 1), the grease passes through the bore or channel 22 or cap 19, pushes the valve A away from the cap 19 and fills the space 15 about the valve head in the housing. If further grease is discharged from the grease gun, the grease is then forced from around the valve head in the housing through the sections 28 and 27 of the passageway in the valve member A, and grease finally enters the chamber 29 below the fitting. When the grease gun is removed from the cap 19 and inward pressure of the grease into the housing of the fitting ceases, the back pressure to which the bearing is subjected will result in causing the valve member A to be pushed outwardly away from the bearing until the vertex and adjacent portion of the conical surface of the head 24 of the valve is thrust against the cap 19 and the tip of the conical surface will close the inner end of the bore 22 of the cap 19. The valve member A will then be in the position shown in Figure 2. When the valve is in this position, passage of grease from the interior of the housing 10 through the cap 19 is prevented and the fitting is sealed. Even when all the grease from the fitting has been dissipated in the bearing the pressure to which the bearing is subjected will still keep the valve member A in the closed or sealing position. Since the entire fitting may be made of non-corrosive metal the presence of corrosive gas or liquid which may pass into the fitting from the bearing under pressure will not injure the fitting.

It would of course be possible to have various modifications in the shape of the valve head and in the resulting engaging and sealing surfaces of valve head and cap or closure on the outer end of the housing, and, while I believe the form in which I have illustrated my fitting with the conically-surfaced valve head and counter-sunk cap channel, to be most practical and satisfactory, nevertheless, it is not my intention to limit my invention otherwise than as set forth in the claims.

I claim:

1. In a grease fitting of the character described for a bearing, a housing, a central opening extending through said housing, a closure on the outer end of said housing, a channel extending through said closure and connecting with said central opening of said housing, a valve slidable in said housing, said valve so arranged as to be spaced from the inner end of said channel of said closure when said valve reaches the extent of its travel inwardly, said valve adapted to bear against said closure when said valve reaches the extent of its travel outwardly, a grease passageway extending through said valve to permit grease to pass from the interior of said housing through said valve to the bearing, said passageway terminating on the outer end of said valve, at a point out of alinement with the inner end of said channel of said closure, thereby preventing communication from said passageway to said channel when said valve is in engagement with said closure but permitting passage of grease from said channel into said housing and thence through said valve passageway to the bearing when said valve is not in engagement with said closure.

2. In a grease fitting of the character described for a bearing, a housing, a central opening extending through said housing, a cap on said housing, a channel extending through said cap and connecting with said central opening of said housing, a valve slidable in said housing, means in said central opening of said housing limiting the movement of said valve member inwardly, said valve so arranged as to be spaced from the inner end of said cap when said valve reaches the extent of its travel inwardly, said valve adapted to engage the inner end of said cap channel, when said valve is pushed outwardly, a grease passageway extending through said valve to permit grease to pass from the interior of said housing through said valve to the bearing, said passageway terminating on the outer end of said valve at a point out of alinement with the inner end of said channel, thereby preventing communication from said passageway to said cap channel when said valve is in engagement with said cap but permitting passage of grease from said cap channel into said housing and thence through said valve passageway to the bearing when said valve is not in engagement with said cap.

3. In a grease fitting of the character described for a bearing, a housing, a cylindrical bore in said housing, a cap on said housing, a channel extending through said cap and connecting with said cylindrical bore of said housing, a valve slidable in said housing, a shoulder in said housing limiting the movement of said valve member towards the bearing, said valve so arranged as to be spaced from the inner end of said cap channel when said valve reaches the extent of its travel towards the bearing, said valve adapted to bear against the inner end of said cap channel when said valve reaches the extent of its travel in the opposite direction, a grease passageway extending through said valve to permit grease to pass from the interior of said housing through said valve to the bearing, said passageway terminating on the outer end of said valve at a point out of alinement with the inner end of said cap channel, thereby preventing communication from said passageway to said cap channel when said valve is in engagement with said cap but permitting passage of grease from said cap channel into said housing and thence through said valve passageway to the bearing when said valve is not in engagement with said cap, and whereby the position of said valve member will be determined by the relative pressures exerted within the bearing or exerted by the grease being injected into said fitting through said cap.

4. A grease fitting of the character described for a bearing, said fitting comprising a housing, a cylindrical bore in said housing, a removable cap on said housing, a channel extending through said cap and connecting with said cylindrical bore of said housing, a valve member slidable in said housing, means in said housing limiting the movement of said valve member towards the bearing, said valve so arranged as to be spaced from the inner end of said cap when said valve reaches the extent of its travel towards the bearing, a head on the outer end of said valve, said valve head adapted to bear against said cap when said valve is pushed outwardly, a grease passageway extending through said valve to permit grease to pass from the interior of said housing through said valve to the bearing, said passageway terminating on the head of said valve at a point out of alinement with said cap channel, thereby preventing communication from said passageway to said cap channel when said valve head is in engagement with said cap but permitting passage of grease from said cap channel into said housing and thence through said valve passageway to the bearing when said valve head is not in engagement with said cap without the use of any spring in said fitting.

5. A springless grease fitting comprising a housing, a cylindrical bore in said housing, said bore having a reduced portion at one end, a cap on said housing, a channel extending through said cap and connecting with said bore of said housing, a shoulder in said housing limiting the movement of said valve member inwardly, said valve so arranged as to be spaced from the inner end of said cap channel when said valve reaches the extent of its travel inwardly, a head on the outer end of said valve, said valve head having a conically-shaped top, said conically-shaped top adapted to engage the inner end of said cap channel when said valve reaches the extent of its travel outwardly, a grease passageway extending through said valve to permit grease to pass from the interior of said housing through said valve to the bearing, said passageway terminating on the conical surface of said valve head at a point out of alinement with the inner end of said cap channel, thereby preventing communication from said passageway to said cap channel when said valve top is in engagement with said cap but permitting passage of grease from said cap channel into said housing and thence through said valve passageway to the bearing when said valve top is not in engagement with said cap, and whereby the position of said valve member will be determined by the relative pressure exerted within the bearing or exerted by the grease being injected into said fitting through said cap.

6. A grease fitting of the character described comprising a housing, means for attaching said housing to a bearing, a stepped, cylindrical bore in said housing, a removable cap on said housing, a channel extending through said cap and connecting with said bore of said housing, the inner end of said cap channel being countersunk, a shoulder in said stepped bore of said housing limiting the movement of said valve member towards the bearing, said valve so arranged as to be spaced from the inner end of said cap channel when said valve reaches the extent of its travel towards the bearing, a head on the outer end of said valve, said valve head adapted to engage the countersink of said cap channel when said valve reaches the extent of its travel outwardly, a grease passageway extending through said valve to permit grease to pass from the interior of said housing through said valve to the bearing, said passageway terminating on the head of said valve at a point out of alinement with the inner end of said cap channel, thereby preventing communication from said passageway to said cap channel when said valve head is in engagement with said cap but permitting passage of grease from said cap channel into said housing and thence through said valve passageway to the bearing when said valve head is not in engagement with said cap, without the use of any spring in said fitting.

SAMUEL WEISS.